Dec. 13, 1932.           R. M. SMYTH           1,890,831
             LIQUID GYROSCOPIC COMPASS
         Filed March 24, 1928    3 Sheets-Sheet 1

Inventor
Rodrigo M. Smyth

Patented Dec. 13, 1932

1,890,831

UNITED STATES PATENT OFFICE

RODRIGO M. SMYTH, OF SAN JOSE, COSTA RICA

LIQUID GYROSCOPIC COMPASS

Application filed March 24, 1928. Serial No. 264,353.

An object of this invention is to provide a method for supporting a body entirely by fluid means in a substantially fixed position.

Another object is to permit a body thus supported to move along predetermined paths.

A further object is to utilize said means, in the form of a gyroscopic system, for the construction of a simple and sensitive compass and other forms of direction and position indicators.

This invention also consists in certain other features of construction and in the combination and arrangements of the several parts, to be hereinafter fully described, illustrated in the accompanying drawings and specifically pointed out in the appended claims.

In describing my invention in detail reference will be had to the accompanying drawings wherein like characters denote like or corresponding parts throughout the several views and in which:—

Fig. 26 shows a further modification of my invention which being symmetrical in construction may be considered a side or a top view.

Figure 1:
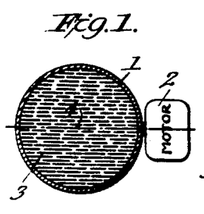
Figs. 1 to 16 show elemental forms of my invention to explain its theory of operation.

To explain the theory of operation of my invention reference is made to Fig. 1 in which 1 is a hollow sphere rigidly fixed to one end of the shaft of an electric motor 2. Said hollow sphere is filled with a liquid 3 (preferably mercury) and is made to spin at any suitable speed. The liquid will also be set spinning due to friction with the solid boundary and since it is entirely surrounded by same will have no resistance to overcome other than its inertia and will thus finally acquire an angular speed equal to that of the hollow sphere. Obviously the axis of spinning of the liquid will coincide with that of the hollow sphere and motor.

Figure 2:
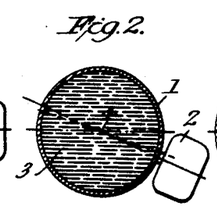

If we impart a rotation to the system (which hereinafter I will call "secondary rotation") about an axis normal to its axis of spinning, such as 4 (Fig. 2) normal to the plane of the paper, the spinning liquid, due to its gyroscopic characteristics will tend to maintain its plane of spinning and will thus lag to a certain extent behind the plane of spinning of the hollow sphere until friction between said hollow sphere and the liquid will overcome said gyroscopic resistance in a manner which will be described later and will make the spinning liquid to follow the new angular movement imparted to the system. But the axis of spinning of the liquid will no longer coincide with that of the hollow sphere and motor; it will lag behind the latter making an angle with same (which I call "angle of lag") which will be a function of the angular speed of the secondary rotation of the system about the axis 4. Said angle is also a function of the speed of spinning but I will consider for the present said latter speed to remain constant.

If now we suppose said secondary rotation of the system to be caused by the rotation of the earth as by placing the axis of spinning in any direction not parallel to the axis of the earth, the same phenomenon will take place and the axis of spinning of the liquid will make a constant angle of lag with that of the hollow sphere, which angle in this case will also be a function of the direction in which the axis of the spinning liquid is placed relatively to the axis of the earth, being a maximum when placed normal to same, diminishing progressively in value until when parallel to the axis of the earth the angle of lag becomes zero. This is due to the fact that the angular movement imparted by the rotation of the earth to the plane of spinning of the system is a function of the angle included between the spinning axis and the axis of the earth.

Figure 4:
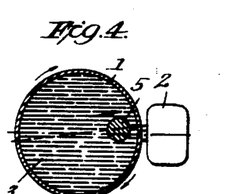

If the axis of spinning of the hollow sphere and its motor be placed and kept constantly horizontal and in any direction not parallel to the meridian at a point in the equator, the angle of lag will take place in a vertical plane, which means that the spinning axis of the liquid will make an angle with the horizontal (Fig. 4). The end of said latter axis pointing or deflected towards the east will go slightly up while the opposite end will go down.

If instead of being at the equator we consider the system to be situated at any point in the northern hemisphere, the angle of lag will always have a vertical component but in addition will have a component in azimuth which is in such a direction as if the spinning axis of the liquid had a tendency to rotate clock-wise (looking down) which in fact is the actual tendency of the spinning liquid as a gyroscope.

If the system is carried to the southern hemisphere, the same vertical component of the angle of lag will exist, but the azimuth component will be in the reverse direction. Both at the northern and southern hemisphere the vertical component is zero at the poles and reaches a maximum at the equator. The opposite is true of the azimuth component.

Figure 9:
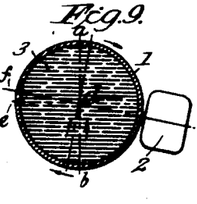

Now I will explain the way in which the spinning liquid follows the angular movements of the system about any axis normal to its spinning axis. It actually takes place by precession and not by a direct force applied in the direction of the angular motion which would not be possible in a gyroscope free to precess. Reference is made to Figs. 1, 9, 10 and 11. When the hollow sphere and liquid are spinning and no secondary rotation is imparted to the system, in a direction normal to its spinning axis, no angle of lag will take place, and consequently no relative motion will exist between the hollow sphere and the liquid in a direction normal to their spinning planes, but when the secondary rotation is imparted to the system the plane of spinning of the liquid will tend to remain stationary, as explained, and an angle will be formed between the spinning axis of the liquid and that of the hollow sphere, and obviously an equal angle will exist between their respective spinning planes which will intersect one another at the axis $c$—$d$ of the secondary rotation as shown in Fig. 9, where $e$ denotes the spinning axis of the liquid (shown in dotted lines), and $f$ that of the hollow sphere (full line); $a$ and $b$ are simply reference letters to indicate the relative position of the system. The dotted lines perpendicular to the spinning axis $e$ of the liquid denote the spinning plane of same, while the full line perpendicular to the spinning axis $f$ of the hollow sphere denotes the plane of spinning of said sphere; the arrows outside the figure show the direction of the secondary rotation, and the arrows inside the figure indicate the direction of the respective spinning movements of said planes.

Figures 10, 11:
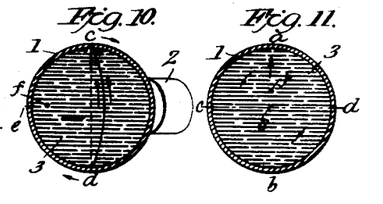

Fig. 10 is a top view of Fig. 9 looking at $a$ towards $b$ along the plane of rotation of the liquid which is indicated by the dotted lines. The arrow parallel to said dotted lines indicates the direction of spinning of the liquid. The curved full line shows the plane of spinning of the hollow sphere while the inclined arrow indicates its direction of spinning. The arrow perpendicular to the dotted lines $c$—$d$ indicate the direction of the secondary rotation of the system about the axis $c$—$d$, normal to the spinning axes.

Fig. 11 is a front view of Fig. 9 looking at $e$ along the spinning axis of the liquid. The two curved arrows indicate the direction of spinning of the system; the straight arrow indicates the direction of the secondary rotation.

From Figs. 9 and 10 it will be clear that while the relative speed between the liquid and the hollow sphere in the direction of spinning is practically unchanged, when the plane of spinning of the hollow sphere has been displaced from that of the liquid as a result of the secondary angular motion, there will be created at $d$, (as well as at $c$ on the opposite side) a relative motion of the hollow sphere with respect to the liquid in a direction normal to the plane of spinning of said liquid and normal to the plane of the secondary rotation as indicated by the arrow at $d$ (Fig. 9) and at $c$ and $d$ (Fig. 10), and the value of which will be equal to the sine of the angle between the spinning plane of the liquid and that of the hollow sphere multiplied by the speed of the spinning motion of the latter. This relative speed at $d$ and $c$, normal to the spinning plane of the liquid will produce a friction torque on said liquid tending to rotate same in the direction of the arrow at $d$ and $c$, but due to its gyroscopic characteristics the spinning liquid will resist said rotation but will precess in a plane normal to that on which the torque is applied, that is, in the same direction of the secondary rotation of the system, thus following the hollow sphere in said secondary rotation after a certain angle of lag has been reached, which angle, as stated, will be a function of the speed of the secondary rotation, (varying approximately as the square root of said speed) and of the speed of the spinning motion (being approximately inversely proportional to the square root of said latter speed).

Figure 3:
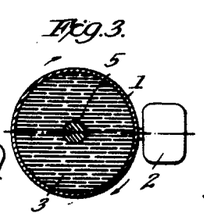

If a body of any form, such as a ball 5 (Fig. 3) lighter than the spinning liquid, is placed within same, it will float to the axis of spinning of said liquid on account of the centrifugal force of the latter and will remain stationary at any point along said axis, having no tendency to move to either side. It cannot move outside of the axis of spinning of the liquid because, as stated, the centrifugal force of the liquid, which creates a sort of gravitational field acting towards the periphery, prevents the body from doing so since it is lighter than the liquid and consequently will float in a direction opposite to that of the centrifugal field until it reaches the axis of spinning where it is acted upon by said field equally in every direction. Of course, the earth gravitation will also act upon the spinning liquid, and consequently upon the floater and will displace the latter to a place somewhat above the spinning axis of the liquid. The magnitude of this upwards displacement may be regulated at will by varying the speed of spinning of the liquid. In fact, at the ordinary speeds contemplated for this kind of apparatus (which may be relatively low) the centrifugal field is much stronger than the earth gravitation and as a result the above mentioned upwards deflection of the floater is very small; however, whatever its value it does not affect the operation of the apparatus which is to be described. On the contrary, it is utilized to some extent.

While the floater cannot move outside of the axis of spinning of the liquid (except in the amount of the upwards deflection above referred to) it is free to move along said axis without any opposition since it is entirely surrounded by the liquid and not even the slightest friction between solids will hinder its movements. Liquid friction will simply retard said movement slightly but the speeds at which it will be required to move when my invention is used as a gyroscopic compass (for which it has been specially designed) are so exceedingly small that even said fluid friction (which is proportional to the square of the speed) will be practically non-existent.

If now we place the whole spinning system with the axis of spinning of the liquid and of the hollow sphere horizontal (Fig. 3) the floating ball 5 will remain stationary at any point of the axis of spinning of the liquid (at its middle point as shown in the figure). But if we allow the system to be rotated by the earth as previously described, the axis of the liquid will make an angle with that of the hollow sphere and consequently with the horizontal as shown in Fig. 4. Since the liquid and the floating ball are under the influence of the gravitation of the earth, which gives to the ball a constant tendency to float upwards, said ball will now be able to do so along the axis of spinning of the liquid moving towards the ends of said axis which has been tilted upwards as shown in Fig. 4. It is apparent that the floater will respond to any inclination of the spinning axis of the liquid, however small.

I will now describe several ways to utilize the above phenomena in the construction of a compass and other forms of direction indicators.

In first place, attention is called to the fact that a given end of the spinning axis of the liquid will always be tilted up when deflected or pointing towards the east, and will be tilted down when deflected or pointing towards the west. This obviously will result in the floater moving in one direction or the other according to the direction of the deflection of said spinning axis relatively to the meridian, the only direction in which the spinning axis of the liquid may remain horizontal is when kept parallel to the meridian. In other words the spinning liquid will behave in the same manner of the gyroscope of an ordinary compass, only that the spinning liquid is not free to move beyond a small angle due to the resulting friction torque, as explained.

The above referred fluid friction torque is however so feeble for small angles (it varies approximately as the square of the angle) that, even for such slow angular movements as the rotation of the earth the resultant angle of lag is considerable, and furthermore the floater is so sensible to any inclination of the spinning axis of the liquid that a very sensitive compass is possible.

Figures 7, 8:
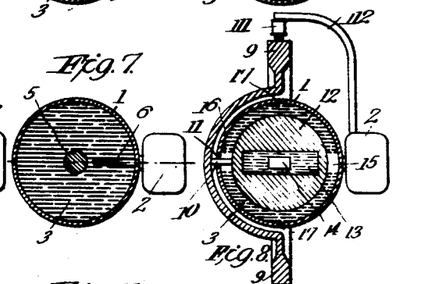

Referring to Fig. 7, 6 is an insulated electric conductor connected to an electric source and dipped into the liquid along its spinning axis, the other pole of the source being connected to the hollow sphere whence the current passes to the floater through the liquid (which is supposed to be a conductor). The end of said conductor 6 nearest to the floater 5 is bare so that an electric current will flow between said end and the floater which is made of a material of much higher conductivity than the liquid (such as copper), which current will depend mainly on the resistance of the portion of liquid between the bare end of the conductor and the floater, and said resistance will in turn depend on the distance between the bare end and the floater. Since the floater will move to one side or the other according to the deflections of the spinning axis of the liquid relatively to the meridian, the electric current will always increase when a given end of said axis is deflected towards a given side of the meridian and will decrease when deflected in the opposite direction. By making these variations of the strength of the electric current to control suitable orientating means as will be explained later, the whole system may be orientated so that its spinning axis will be parallel to the meridian or, in other words, one of its ends pointing north and the other south.

Figure 5:
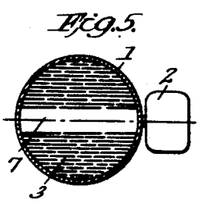

Fig. 5 shows a spinning hollow sphere similar to those already described but which is not entirely filled with liquid. Due to the centrifugal force the liquid will go to the outer portions of the hollow sphere and a cylindrical empty space 7 will be left in the center along the spinning axis, the axis of said cylindrical space coinciding with the spinning axis of the liquid 3. This central space or shaft may be filled with air, or any other fluid, gaseous or liquid, lighter than the spinning liquid.

Figure 6:
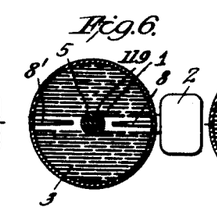

Fig. 6 shows a device similar to that illustrated in Fig. 7 but provided with a central space as the one shown in Fig. 5 filled with air, oil, or any other electrical insulating fluid. In this case a portion of the floater 5 will be submerged within the insulating fluid contained in the central shaft 7. Two conductors 8 and 8' are inserted along said central shaft without touching the conducting spinning liquid 3 to a convenient distance from the floater when at its normal position. Said conductors 8 and 8' are also insulated from the hollow sphere 1. The spinning liquid is connected to a pole of an electric source (not shown) and the two conductors to the other pole, but through two different circuits. The floater, (which is of conducting material) when moving to one side or the other, will close either of the two circuits, according to the direction in which the axis of the liquid has been deflected relatively to the meridian, and the orientating means are correspondingly set into action. It will be observed that since the central space 7 is filled with a fluid lighter than the surrounding liquid, the lighter fluid will not be able to pass from one side to the other around the floater 5 since the centrifugal force of the heavier liquid will prevent said lighter fluid from doing so and consequently the floater itself will be prevented from moving to either side. This fact is utilized in the elemental apparatus shown in Fig. 8 which is described below, as well as in the other embodiments of my invention to be described later. In order to permit the floater of Fig. 6 to move freely along the spinning axis of the fluid and make the electrical contacts, as described, the two portions of the central shaft separated by the floater are communicated with each other by means of conduits 119 traversing the floater, of which conduits there may be as many as necessary.

Fig. 8 shows an apparatus, the floater of which has been made much larger and preferably hollow or of a light material and supports a flywheel 9 by means of the short shaft 10 passing through a hole 11 made in the hollow sphere 1. The object of this additional flywheel is to place most of the spinning mass as far as possible from its axis so as to increase as much as possible its gyroscopic characteristics for a given total mass.

Within the floater 12 there is a cylindrical cavity 13 filled with liquid and a second cylindrical inner floater 14 is placed within said liquid. In this case the end 15 of the central shaft (which may be filled with air) does not communicate with the other end 16 of said shaft so that the bigger or main floater 12 will be unable to move to either side, but will be free to move in any direction about its geometrical center. On the other hand, the inner floater 14 is free to move to one side or the other according to the inclination of the spinning axis of the inner liquid 13 which obviously coincides with the spinning axis of the main floater and with that of the outside spinning liquid 3. The same combinations to control the orientating means may be made with the inner floater of Fig. 8 as those which have been described for the single (spherical) floater of Figs. 6 and 7.

Since the inner floater 14, as that shown in Fig. 8, as well as the single floater of the other figures have practically no tendency to move in any direction when the axis of spinning of the liquid is horizontal, it is convenient to provide some means to give said floater a tendency to remain at a fixed position along said spinning axis of the liquid so that when displaced by any cause it will be made to return to its original position. This tendency should, of course, be sufficiently small to permit the floater to move a reasonable distance with the feeble inclinations produced by the rotation of the earth, especially when the spinning axis of the liquid is deflected from the meridian only by a very small angle.

In order to provide the floater with said tendency to maintain a fixed position, it is made of iron or of any other magnetic material and a coil 17 of one or more turns of wire, is wound around the main floater 12 or either outside or inside of the hollow sphere 1, or in any other convenient place of the system, and a feeble electric current is made to pass through said coil. This will create a magnetic field which will maintain the middle portion of the floater approximately in the plane of the coil of wire. Obviously the floater will acquire a definite period of oscillation, and by judiciously regulating the strength of the current the magnitude of the centering tendency of the floater and consequently its period of oscillation may be varied at will, the intensity of the current being a direct indication of the period of the floater. Conversely, if the period of oscillation of the floater is known, the intensity of the current may be calculated, which makes an apparatus of this kind an actual electric measuring instrument.

Of course, whatever the centering tendency of the floater and its period of oscillation, the general operation of the system is not modified.

Heretofore, I have considered the axis of spinning of the liquid to be perfectly straight. This is true when there is no floater within the spinning liquid and the axis of the latter is horizontal. I have already explained how the floater is always slightly above the axis of spinning of the liquid. This causes said axis to bend slightly upwards due to the unequal relative speed between the floater and the liquid since both are spinning about parallel but slightly separated axes. The friction resulting from said unequal rotational speeds, tends to rotate the liquid adjacent the floater about the axis of the latter, in which action the floater succeeds to some extent, thus causing the slight upward bending of the axis of spinning of the liquid. The upward displacement of the spinning axis of the liquid will gradually diminish as the distance to the floater increases, due to the influence of the sides of the hollow sphere which, also by friction, will tend to maintain the spinning axis of the liquid coincident with its own spinning axis. This will give to the spinning axis of the liquid a curvature which by itself will tend to maintain the floater in the middle of the hollow sphere, but since it is actually very small, and besides, is not easily regulable, I prefer to reduce it as much as possible and provide the more positive electro-magnetic centering means already described. However, in some cases said curvature of the spinning axis of the liquid will suffice by itself to produce the required centering tendency of the floater.

Figure 12:
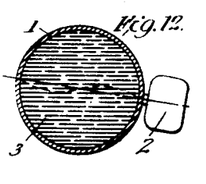

When an angle of lag exists between the axis of spinning of the liquid and that of the hollow sphere the influence of the latter will tend as explained above to maintain said axis of the liquid coincident with its own axis and this action will produce a curvature of the inclined axis of the spinning liquid as shown in Fig. 12 by the dotted lines.

Figures 21, 23:
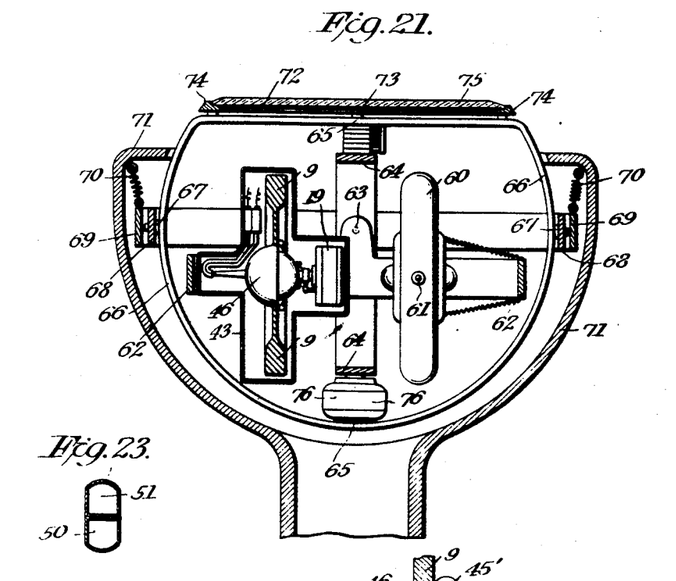
Fig. 21 is a side elevation, partly in section, of one of the preferred embodiments of my invention.
Fig. 23 is a cross-sectional view on line 23—23 of the pneumatic tubes "50" and "51" of Fig. 22.
Figure 22:
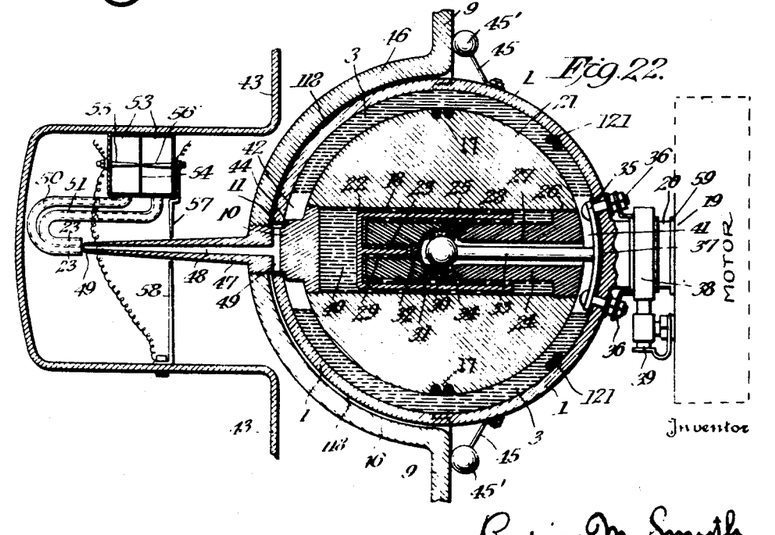
Fig. 22 is a detailed view of Fig. 21.

I will now describe the preferred embodiment of my invention which is shown in Fig. 21, and in more detail in Fig. 22. It is of the general type shown in Fig. 8 but provided with an inner floater 18 of special construction for producing variations of an electric current in a more effective manner than that used in the elemental apparatus shown in Fig. 7. Referring to said Fig. 22, 1 is the hollow sphere and 19 is an electric motor (preferably of the induction type) to spin said hollow sphere which is rigidly connected to the left hand end of the motor shaft 20; 9 is the flywheel supported by the main floater 21 through the means of the short shaft 10. The inner floater 18 is made of magnetic electrically conducting material in the form of a hollow cylinder open at both ends and provided at its left hand end with a narrow strip 22 along one of its diameters to which strip is rigidly fixed a slender rod 23 which extends along the axis of the cylindrical inner floater 18. Said strip and rod are made preferably of nonmagnetic but electrically conducting material. The center member 24 is made of insulating material and is composed of two separate sections screwed together at 25. The right hand section is fixed at 26 to the main floater 21 and is provided with a central conduit 27 which widens at 28 forming half of a spherical cavity whose center coincides with the center of the hollow sphere 1. The left hand section of member 24 is provided with a shorter and narrower central conduit 29 which also widens at 30 forming the other half of the central spherical cavity. The semi-spherical wider portion 30 is provided with a semi-spherical thin metal plate 31 which fits snugly into said wider portion and is fixed by means of the threaded portion 32 to the end of the central conduit 29, thus hermetically closing the same. Said conduit 29 is just of sufficient diameter to permit the rod 23 of the inner floater to move within it as a plunger but without being touched by same. Within the conduit 27 there is an axial rod which ends in a spherical abutment 34 concentric with the spherical cavity 28 but separated from same by a small distance. At its right hand end the rod is rigidly fixed to the hollow sphere but without making electrical contact with same. This is accomplished by means of the metal plate 35 which is integral with the rod. Said plate is held in place by bolts 36 and is separated from the hollow sphere by the insulating sheet 37. The bolts are surrounded by insulating bushings, and the nuts are insulated by means of insulating washers. The outside ends of the bolts are connected to a collecting ring 38 from which a brush 39 fixed to the stator of the motor 19 collects the electric current which is made to pass through the system.

The central spherical cavity 28 is partly filled with mercury so that when the system is at rest it will not flow out through the conduit 27 which is filled with air. This mercury serves to make the electrical connection between the abutment 34 and the semi-spherical plate 31. When the system is in operation it will be maintained by centrifugal force in the periphery portions of said cavity. The cylindrical cavity 40 within which is the inner floater 18 is also filled with mercury which thus will fill the conduit 29 within which the axial rod or plunger 23 moves. 3 is the mercury whose centrifugal action maintains the spherical main floater 21 in its central operating position. Since the intervening space between said main floater and the hollow sphere is not entirely filled with mercury, two disk-like spaces will be left at 41 and 42, the former extending into member 24 through conduit 27 which will be filled with air or with whatever fluid fills the casing 43. The air-space 41 does not communicate with the outside atmosphere nor with the other air-space 42 so that, as explained in reference to Fig. 8, it will serve to prevent the main floater 21 to move to either side. The air-space 42 communicates with the outside atmosphere by means of the aperture 11 through which passes the short shaft 10 which rigidly connects the flywheel 9 to the main floater 21.

To prevent the mercury 3 to flow out of the hollow sphere when at rest, the short shaft 10 is provided with a wider portion 44 which is pressed against the edges of the opening 11 by the action of the springs 45 mounted on the hollow sphere and which press against the flywheel 9. Each spring terminates in a ball 45' which when the system spins at sufficient speed makes said ball, by centrifugal force, to separate from the flywheel, thus relieving the latter from its pressing action. This is calculated to take place after the mercury within the hollow sphere has attained its normal operating position, when the two air-spaces 41 and 42 will have been formed. When the springs relieve the flywheel of their pressing action the wider portion 44 of the shaft 10 would still remain in contact with the edges of the aperture 11 if there were not provided some force to press upon the main floater to counteract to some extent the action of the air-space 41 which tends to maintain said main floater in a fixed position. This force is supplied by the centrifugal action of the layer of air 118 which fills the space between the hollow sphere and the semi-spherical portion 46 of the flywheel. Said centrifugal force will produce a depression in said layer of air 118, whereupon the atmospheric pressure will press the flywheel towards the hollow sphere and consequently will separate the wider portion 44 of the shaft from the edges of the aperture 11 until the resisting action of the air space 41 will compensate the force produced by the depression. When the system is stopped the action is reversed and the aperture 11 is closed. The whole action is entirely automatic and will take place every time the system is put into operation or stopped.

The circuit followed by the electric current traversing the circuit is as follows:—One pole of the source is connected to any suitable part of the system, such as a bearing, whence the current passes to the hollow sphere 1 and through the mercury 3 to the main floater 21, then through the inner mercury 40 to the inner floater 18, and from the plunger 23 of said inner floater through the cylindrical column of mercury contained within the conduit 29 to the semi-spherical metal plate 31 and from this through the mercury contained within the central spherical cavity 28 to the metal ball 34 and rod 33 whence the current passes to the plate 35 and thence to the collecting ring 38 where it is collected by brush 39 and led to the orientating means which are connected to the other pole of the electric source.

Additional and independent methods to control the orientating means are described below.

47 is an extension of the short shaft 10 provided with a narrow axial conduit 48 which leads through the transverse conduit 49 to the aperture 11 and thence to the air-space of layer 118 separating the semi-spherical portion 46 of the flywheel 9 from the hollow sphere. As already explained, a depression exists in said air-layer 118 when the system is in operation wherefrom a constant air-current will be created within the conduit 48 entering by its open end 49. In front of said end, and as close to same as possible, two tubes 50 and 51 terminate, one above the other, the cross-section of which on line 23—23 at said terminal point is preferably of the form shown in Fig. 23. These tubes lead to a special diaphragm manometer 53 provided with two compartments separated by the diaphragm 54 each one of which compartments is communicated with one of the two tubes 50 and 51. When the end 49 of the conduit 48 is in its normal position the depression existing within said conduit acts equally on both sides of the diaphragm of the manometer, but as soon as conduit 49 is displaced from its central position as a result of a movement of the flywheel 9, the terminal of the tube towards which the conduit 49 has moved, will be covered to a greater extent by the end 48 of said conduit, thus increasing the depression produced within said tube, while in the other tube the reverse action takes place, with the result that the diaphragm will bend and close an electric circuit through either of the two contacts 55 or 56. The same operation may be performed directly without the use of the manometer by means of the contacts 57 and 58 through which the same circuits may be closed when the extension 47 is displaced sufficiently to touch them. The orientating means are thus actuated in one or the other direction according to the circuit which has been closed.

The three methods described for controlling the orientating means, namely, the variable resistance method, the pneumatic method and the direct contact method may be of special service according to the sensitivity required in different occasions, and since the inclusion of all three adds but little complications to the system it is convenient to do so whenever possible.

The shaft 20 of the motor is preferably made of nonmagnetic material in order to avoid the influence of the magnetic fields of the motor on the inner floater 18, but, if desired, steel bushings 59 are provided around the portions of the shaft comprised within the bearings in order to give those portions good wearing qualities. The hollow sphere 1 and the flywheel 9 are preferably made of iron or steel of high magnetic permeability for the same purposes set forth above. The main floater 21 and the rest of the parts within same are preferably made of nonmagnetic material except the inner float 18 which is totally or partially made of magnetic material.

43 is the casing surrounding and supporting the motor, hollow sphere, flywheel and the pneumatic and direct contact controlling systems. 60 is the casing of an ordinary gyroscope spun by a built-in motor in a direction opposite to that of the motor 19 and about an axis which, when in normal position is horizontal and in line with that of said motor 19. The casing 60 is pivoted so as to permit said gyroscope to be free to precess about an axis 61 for the purpose of stabilizing the whole system in azimuth and to permit said system to oscillate freely about any axis parallel to said axis 61. The gyroscopic characteristics of said gyroscope are made of equal magnitude to the gyroscopic characteristics of the system within the casing 43. In this way the whole system will be free to oscillate in any direction without any gyroscopic resistance but will be gyroscopically stabilized for movements in azimuth.

The two casings 43 and 60 are supported by a horizontal frame or ring 62. Casing 43 is rigidly fixed to said frame, while casing 60 is pivoted thereto at 61, as already described. Said frame 62 is pivoted at 63 (to oscillate about a horizontal axis lying above the center of gravity of the system so as to make same pendulous) on a vertical gimbal ring 64 which in turn is pivoted at 65 (to rotate in azimuth) on a second vertical ring 66 pivoted at 67 (to oscillate about a horizontal axis) on a horizontal ring 68. The latter is pivoted at a point (not shown) at right angles to pivot 67 (to oscillate about a horizontal axis normal to the horizontal axis 67—67) on a second horizontal ring 69 which is suspended by means of spring 70 from the binnacle 71.

72 is the compass-card which is fixed to the inner vertical ring 64 by means of an extension of the trunnion 73. The lubber ring 74 is fixed to the outer vertical ring 66. 75 is a glass plate fixed on the lubber ring 74. 76 is the orientating direct current motor controlled by the means already described and which is so designed as to reverse its direction of motion when the current is reversed. The stator is rigidly mounted on the outer vertical ring 66 while its rotor is rigidly fixed to the inner vertical ring 64, the lower end of its shaft constituting the lower pivot 65 of said inner ring 64.

Figure 27:
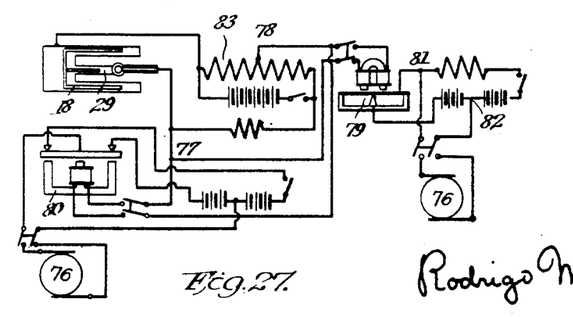
Fig. 27 shows the wiring diagrams of the different circuits.

The wiring diagrams shown at Fig. 27 are self-explanatory. When the inner floater 18 is in its normal position the resistance of the different circuits are so balanced that no difference of potential will exist between the points 77 and 78. But any variation of the resistance of the column of mercury 29 regulated by the inner floater 18 will cause a current to flow in one direction or the other depending on whether the resistance has been decreased or increased. This current is led either to the polarized quantitative microphonic amplifier 79 or to the make and break polarized relay 80. The amplified current from the microphonic amplifier 79 passes through a circuit, the resistances of which are so balanced that no current will flow through the circuits connected to the points 81 and 82, as soon as the resistance of the microphonic contact varies, a current will flow in one direction or the other which will operate the orientating motor 76 accordingly. If the relay 80 is used, the direction of the exciting current will control the direction of the relayed current which will operate the orientating motor 76.

The resistance 83 is used to provide a suitable voltage drop for supplying current to the inner floater circuit in order to eliminate the effect of voltage variations which are liable to occur when several cells are used, and a neutral point such as 78 is required. Any kind of electric source, (preferably of direct current) can be used on this circuit, but for convenience of illustration batteries have been shown. Also, any other kinds of relays or amplifiers can be used.

Figure 24:
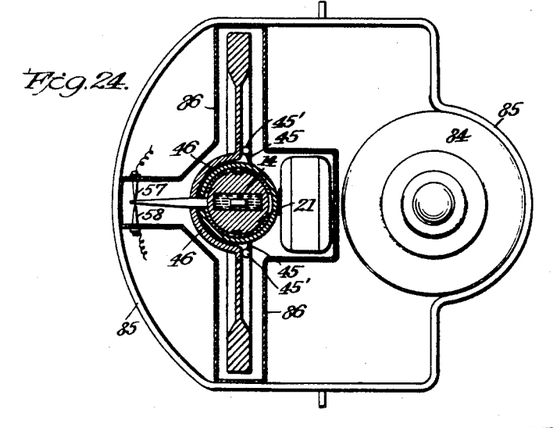
Fig. 24 is a top view of a modification of my invention.

Fig. 24 is a top view of a modification of my invention which is the substantial equivalent of the elemental apparatus shown in Fig. 8, but an ordinary gyroscope spinning in a horizontal plane is provided to prevent the system from oscillating in any direction, except in azimuth. The casing 84 of said gyroscope is rigidly fixed to the frame 85 to which the casing 86 is also rigidly fixed. The whole system is pendulously mounted in the same way of the apparatus shown in Fig. 21. The inner floater 14 is of the simple type shown in Fig. 8 and is not intended to control the orientating motor directly. Its action is by gravity and is as follows:—When the inner floater moves to one side or the other, the center of gravity of the main floater 21 is correspondingly shifted and this causes the floating gyroscopic system constituted by the flywheel 9 and the rest of the spinning parts rigid with same, to precess slightly to either side in accordance with the direction to which the inner floater has moved, and this side-movement of the system will close one of the two controlling circuits through one of the two contacts 57 or 58, thus actuating the orientating motor 76 in one direction or the other. Pneumatic controlling means of the type previously described could also be used. I must point out the fact that this gravity action of the inner floater does actually take place in the apparatus of Fig. 21, and in general in all modifications provided with a movable floater, which modifications if provided with two lateral contacts or with two lateral pneumatic tubes could function in a similar way.

Figures 25, 26A:
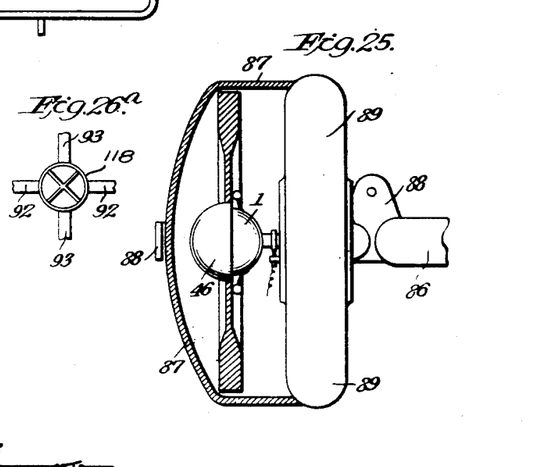
Fig. 25 is a side view of another modification of the apparatus.
Fig. 26a shows a detail of Fig. 26.

Fig. 25 is a side view of another modification of my invention. It is of the variable resistance inner floater type similar to the form shown in Fig. 21 but the rotor of the spinning motor 89 is made sufficiently large to constitute by itself a gyroscope to stabilize the system in azimuth. As in the modification shown in Fig. 24, the system is also provided with a second gyroscope spinning in a horizontal plane, the casing 86 of which gyroscope, as well as the casing 87 and motor 89 are rigidly fixed to the frame 88. The whole system is pendulously mounted in a similar way to that shown in Fig. 21. Pneumatic or direct contact controlling means could also be used in this modification.

Fig. 26 shows a further modification of my invention which being symmetrical in construction may be considered either a top or a side view. It has no inner floater of any kind. It is constituted simply by the main floater 90 rigidly connected to the shaft of the motor. The hollow sphere 117 supports in this case the flywheel 91, and the system is mounted in a similar way to that shown in Fig. 21 but is made nonpendulous so that it will remain in whatever position it is placed, and as it will be apparent from the general type of mounting described and shown in said Fig. 21, it will be capable to rotate in any direction or to remain in a fixed position while the system rotates in any direction. This modification is provided with two pairs of pneumatic controlling tubes 92 and 93, one tube above, one below, and one at each side, each pair of tubes being communicated to a manometer 94 and 95. Fig. 26a illustrates the arrangements of the two pairs of tubes. It shows the central circular part 118, where the tubes terminate, as viewed from the end of extension 47, which end is placed as near as possible to said central part 118. Extension 47 is provided with a narrow axial conduit (not shown) similar to 48 of Fig. 22 and which is connected to a narrow tube 119 which extends radially following the contour of the hollow sphere 117 up to any convenient point. It is apparent that an air jet will be induced through the axial conduit of the extension 47 due to the action of centrifugal force upon the air column contained in the narrow radial tube 119. The magnitude of the suction will depend on the length of said radial tube 119. The operation of the two manometers 94 and 95 is in all other respects identical to that of the manometer of Fig. 22. The device could also be provided with two pairs of controlling contacts (not shown) distributed in a similar way. Either of the two controlling systems may be employed according to the sensitivity required. The purpose of this modification is to maintain in a fixed position the plane of rotation of the spinning members for the purpose of having a reference system by which it would be possible, at least with a reasonable approximation, the position of the system relatively to a predetermined point of the earth, such as the latitude of the place, when mounted on a moving object. With two such systems set at right angles to each other it would be possible to know the latitude and longitude of the place.

The operation of the device is as follows:—
The two lateral pneumatic tubes 92 control an azimuth motor identical to 76 (Fig. 21) which rotates the system about a vertical axis. The upper and lower pneumatic tubes 93 are made to control a motor (not shown) mounted on the inner vertical ring 64 at the pivots 63, or on the corresponding opposite side, and intended to rotate the system about a horizontal axis 63. It is apparent that any movement of the system will close one of the four contacts, or will actuate one of the two manometers, either of which actions will actuate one of the two motors, the connections of which are arranged so that the resulting movement will always be in opposition to the disturbing movement.

Other controlling systems for making and breaking an electrical contact and thus operate either an orientating motor or the two motors of a system for maintaining a plane fixed in space, are described below.

Figure 18:
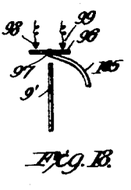

96 in Fig. 18 is a small metal plate pivoted at 97 on a support 105 fixed to the stator of the spinning motor (not shown) and subjected to the air stream produced by the flywheel 9'. When the latter is in its normal position, the pressure produced by said air current will be equal on both sides of the pivoted plate which thus will not tend to move to either side. But as soon as the flywheel is deflected to one side, the pressure will increase on that side and diminish on the other. This will tilt the plate and a contact will be made at 98 or 99.

Figure 20:
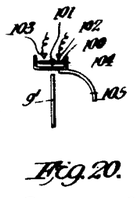

100 in Fig. 20 is a steel strip permanently magnetized and pivoted at 101. 104 is a shield for protecting the magnet from the air stream. The flywheel 9', being of steel or iron influences said pivoted magnet equally on both sides when in normal position, but will influence one or the other to a greater extent when deflected to either side, thus tilting the magnet and making a contact at 102 or 103.

Figure 19:
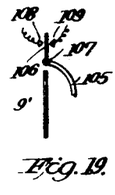

106 in Fig. 19 shows a thin metal plate pivoted at 107 and subjected to the air stream. Any deviation of the latter will cause the light plate, which always tends to remain parallel to the air current, to move to one side or the other and close one of the two contacts 108 or 109.

Figure 17:
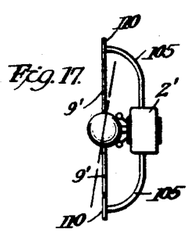
Figs. 17 to 20 show different types of relays and follow-ups that may be used in my invention.

110 in Fig. 17 is a side view of a thin metal ring, (or of any other material) rigidly fixed to the stator of the spinning motor 2 and placed near and around the flywheel 9' so that it will be subjected to the air stream. The system is not pendulous and is mounted in the same way of the device shown in Fig. 21, but is not provided with orientating motors of any kind. Any deflection of the air stream will produce a similar deflection on the surrounding ring 110, and consequently to the whole system, the spinning plane of which will thus remain always in the plane of the flywheel 9' which in turn, being nothing but a gyroscope, will tend to remain rotating on a fixed plane.

111 in Fig. 8 shows an electromagnet (or a permanent magnet) fixed to the stator of the motor 2, which if desired may be added in special cases to any of the systems described. Its purpose is to produce a similar effect to that of gravity when the spinning axis of the liquid is tilted relatively to said electromagnet; viz., to make the inner floater (which is made to be under the influence of said electromagnet) to move to either side. The advantage of this magnetic method is that it would work when the spinning axis of the liquid is tilted in any direction and not only when tilted in a vertical direction, as is the case with the gravity action. Of course, the magnetic shields of the type described for the apparatus of Fig. 21, should be eliminated or modified so as not to interfere with the magnetic action of the electromagnet 111. Said electromagnet may be placed and fixed on any non-rotating part, either within or outside the system, and in such a way that the inner floater when not disturbed, will remain in its normal position.

A further modification of my invention is shown in Figs. 13, 14, 15 and 16, its operation being as follows: If instead of a hollow sphere, a circular tube such as 113 (Fig. 13) (which in reality is an elemental part of such a sphere) filled with liquid is spun about an axis parallel to the plane of said circular tube, the liquid will behave in a similar way to that described for the hollow sphere only that the spinning of the liquid will be accomplished in a more positive way since it is confined within the tube. If a secondary rotation about an axis normal to the axis of spinning is imparted to the system, the liquid, due to its gyroscopic characteristics, will tend to remain stationary, but will succeed in doing so only along the tube and this will give rise to an alternating motion of the liquid relatively to the tube, (corresponding to the movements of the liquid relatively to the hollow sphere previously described and illustrated in Figs. 9, 10 and 11). The maximum speed of which will take place at the moment when the plane of the circular tube (not its plane of spinning) is parallel to the axis of the secondary rotation. This alternating motion will progressively increase in amplitude until friction causes the column of liquid within the tube to precess about the axis of the secondary rotation at sufficient speed to follow said secondary rotation.

If a stopper 114 (Fig. 13) is introduced within the tube 113 so as to prevent the liquid from moving relatively to the tube, said liquid will follow without lag the secondary rotation of the system but the stopper will be subjected to a series of alternating pressures, a complete cycle of which will take place at each revolution of the tube.

Figure 13:
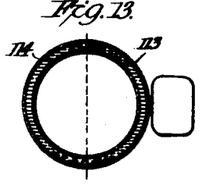
Figure 14:
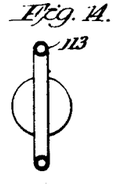

Fig. 14 is a cross-sectional view of Fig. 13.

If instead of a single loop of tube, a number of such loops be connected in series (Fig. 15) the pressures produced in all of them will be added together and it will be possible to obtain a relatively large pressure even with a slow secondary rotation (such as that of the earth).

Figure 15:
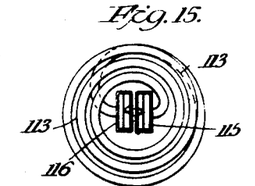
Figure 16:
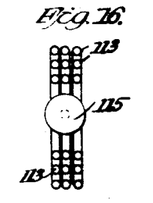

Fig. 16 is a cross-sectional view of Fig. 15.

To utilize such alternating pressures any kind of pressure responsive means can be used such as microphonic contacts, piezo electric crystals, etc. Fig. 15 shows each of the two ends of the coil of tube 113, connected to a sort of manometer the diaphragms 115 and 116 of which press against a microphonic contact thus producing alternating variations of an electric current which may be utilized to control an orientating motor or motors for any of the purposes previously described.

If the floater used in any of the embodiments of my invention is made of any form, other than spherical, (such as floater 18 of Fig. 22) it will tend to remain in a fixed position relatively to the plane of spinning of the liquid, (although being free to move along the axis of spinning) so that when tilted the floater will return to said position. The same result may be obtained, even if the density of the floater is not uniform by suitably distributing its mass relatively to its center of flotation.

Since the position of the spinning axis of the system, relatively to the horizontal, affects the settling position of the compass card in most of the pendulous systems described above, it is possible to compensate any permanent errors arising from any abnormal cause by simply shifting the center of gravity of the system to one side or the other, as by coil 121 (shown in Fig. 22) similar to coil 17 but placed at one side of same in any convenient place of the system, through which coil 121 a regulable electric current is made to pass, so as to change the normal settling position of the inner floater 18. By so shifting the center of gravity it is possible also to compensate for the north-steaming error arising when the ship is heading in any direction other than due east or west. The latitude error is compensated in a similar way.

The quadrantal error practically does not exist in the form shown in Fig. 21 due to the fact that it is free to oscillate in any direction. In the other forms, provided with a stabilizing gyroscope, it is eliminated by making the period of oscillation of the system sufficiently long as to prevent its being oscillated by the rolling of the ship.

The ballistic error in the form shown in Fig. 21 practically does not exist since the period of oscillation of the system is very short and any deviations caused by the accelerations of the ship are rapidly compensated. In the other forms the error persists for a longer time (which, however, is not more than a few minutes) since the period of the gyroscopically stabilized pendulous system is longer.

What I claim is:—

1. In a device of the class described, a liquid, means to hold said liquid, means to spin said liquid and means to detect any deflection of the spinning axis of the liquid relatively to any predetermined system of reference.

2. In a device of the class described, a liquid, means to hold said liquid, a floating body within the liquid, means to spin said liquid and the floating body and means influenced by change of position of said body relative to any predetermined system of reference to detect said change of position.

3. In a device of the class described, a liquid, means to hold said liquid, means to spin the liquid, a floating body within the liquid and means to apply a force upon the floating body to move same in a direction substantially parallel to the spinning axis of the liquid, whenever said axis is deflected relatively to any predetermined system of reference.

4. In a device of the class described, a liquid, means to hold said liquid, a floating body within the liquid provided with a hollow space, a liquid within said hollow space, means to spin the two liquids and the floating body, a second floating body within the second liquid and means to apply a force upon the second floating body to move same in a direction substantially parallel to the spinning axis of the liquids, whenever said axis is deflected relatively to any predetermined system of reference.

5. In a device of the class described, means to hold a liquid, a liquid partially filling said holding means, means to spin the liquid, a second fluid within the holding means filling the spaces not filled by the liquid, said second fluid being lighter than and immiscible with the liquid so that it will settle at the axial portions of same when spinning, and a floating body within the liquid in such a position when the liquid is spinning as to divide the lighter fluid into two separate portions.

6. A system for holding a body within a restricted space without contact with another solid substance, comprising:—means to hold a liquid, a liquid partially filling said holding means, means to spin the liquid which due to centrifugal force will settle at the peripheral portions of the holdings means leaving a cylindrical axial portion not filled with liquid, a fluid, lighter than and immiscible with the liquid, filling the spaces of the holding means not filled by the liquid, and a floating body within the liquid in such a position when the liquid is spinning as to divide the lighter fluid into two separate portions.

7. In a device of the class described, a liquid, means to hold said liquid, means to spin said liquid, means to detect any deflection of the spinning axis of the liquid relatively to any predetermined system of reference and means controlled by said detecting means to rotate the spinning system in a direction depending on the direction of the deflection of the spinning axis of the liquid.

8. In a device of the class described, a liquid, means to hold said liquid, a floating body within the liquid, means to spin said liquid and the floating body, means including said floating body to detect any deflection of the spinning axis of the floating body relatively to any predetermined system of reference, and means controlled by said detecting means to rotate the spinning system in a direction depending on the direction of the deflection of the spinning axis of the floating body.

9. In a device of the class described, a liquid, means to hold said liquid, a floating body within the liquid provided with a hollow space, a liquid within said hollow space, means to spin the two liquids and the floating body, a second floating body within the second liquid, which thus will be capable of moving in one direction or the other along a path substantially parallel to the spinning axis of the second liquid, orientating means influenced by the movements of said second floating body to return said axis to its normal position whenever deflected therefrom and means to provide the second floating body with a restoring tendency which will tend to return said floating body to its normal position whenever displaced therefrom, the normal position of the second floating body being any convenient position selected before hand along the above mentioned path.

10. In a device of the class described, a liquid, means to hold said liquid, means to spin said holding means and liquid, a floating body within the liquid, and means to provide the floating body with a restoring tendency which will tend to return said floating body to its normal position whenever displaced therefrom in one direction or the other along a path substantially parallel to the spinning axis of the liquid, along which path said position is selected beforehand.

11. In a device of the class described, a liquid, means to hold said liquid, a floating body within the liquid provided with a hollow space, a liquid within said hollow space, means to spin said holding means and the two liquids and the floating body, a second floating body within the second liquid, which thus will be capable of moving in one direction or the other along a path substantially parallel to the spinning axis of the second liquid whenever said axis is deflected relatively to the horizontal and means to provide a second floating body with a restoring tendency which will tend to return said floating body to its predetermined normal position whenever displaced therefrom.

In testimony whereof I affix my signature.
RODRIGO M. SMYTH.